United States Patent [19]

Chiang

[11] Patent Number: 5,322,622
[45] Date of Patent: Jun. 21, 1994

[54] FILTERING DEVICE FOR AN AQUARIUM TANK

[76] Inventor: Michael Chiang, No. 16, Lane 112, Sy Yuan Road, Shin Chuang City, Taipei Hsien, Taiwan

[21] Appl. No.: 67,913
[22] Filed: May 27, 1993
[51] Int. Cl.$^5$ ............................................. A01K 63/04
[52] U.S. Cl. .................... 210/169; 210/205; 210/220; 210/416.2; 119/261; 261/DIG. 75
[58] Field of Search ................ 210/169, 220, 416.2, 210/205; 119/5, 261; 261/DIG. 75

[56] References Cited

U.S. PATENT DOCUMENTS

| | | | |
|---|---|---|---|
| 3,295,681 | 1/1967 | Robert et al. | 210/169 |
| 3,891,555 | 6/1975 | Bennett et al. | 210/169 |
| 4,944,871 | 7/1990 | Ogawa | 210/169 |
| 5,006,238 | 4/1991 | Tominaga | 210/169 |
| 5,011,600 | 4/1991 | Mowka, Jr. et al. | 210/169 |
| 5,131,821 | 7/1992 | Miarioni et al. | 210/169 |

*Primary Examiner*—Stanley S. Silverman
*Assistant Examiner*—Robert J. Popovics
*Attorney, Agent, or Firm*—Lowe, Price, LeBlanc & Becker

[57] ABSTRACT

An improved filtering device for an aquarium tank, particularly a filtering device in which a plurality of "U" notches are formed at equal distance in the rim of the cup, the arc section formed by two notches has a lateral rib and the circular connecting rings in the lower portion of the cup allow the cups of the filtering device to be connected easily, the cup can also be rotated freely after connecting. In addition, the suction tube with the impeller, the filtering cotton and the carbon dioxide guide tube as well as the submerged motor combine to function so that carbon dioxide can be dissolved completely in water. Moreover, more oxygen can be generated inside the aquarium tank for healthier fish and plants, the filtered water through the filtering device according to the present invention becomes pure, crystal clear with a whirling and bubbling action.

4 Claims, 6 Drawing Sheets

FILTERING DEVICE FOR AN AQUARIUM TANK

BACKGROUND OF THE INVENTION (a) Field of the Invention

The present invention relates to a filtering device for an aquarium tank. More specifically, the present invention relates to the structure of an improved filtering device in which the cup body can be connected easily and carbon dioxide can be fully dissolved to give a pure, crystal clear conditioned water in the aquarium tank.

(b) Description of the Prior Art

The assembly of a conventional filtering cup for an aquarium is shown in FIG. 1. The upper cup A1 has a tapered bottom edge A11 the diameter of which is smaller than the upper cup A1. A plurality of equidistant notches A12 is located on the bottom edge A11 of the upper cup A1. Each notch A12 has a rib A121 which is used to fit into a corresponding flange A21 of the lower cup A2. The connecting of the upper cup A1 and the lower cup A2 can be accomplished by aligning the flange A21 with the notch A12 together. Either one of the cups can be twisted to allow the flange A21 to fit with the corresponding rib A121. However, the cup body with this kind of connection has the following disadvantages:

(1) The upper cup and the lower cup have to be aligned first, then twisted to connect together. Therefore, the connection can not be accomplished quickly.

(2) The assembly of the upper cup and the lower cup is complex, as can be seen from the aforesaid description.

(3) The cup assembly can nor be rotated freely to change the flow direction of water. Hence, the filtering device in the aquarium can not be operated efficiently.

The structure of a conventional carbon dioxide diffusing tube is shown in FIGS. 2a and 2b. It is made up of two semi-shell bodies 1 and 2 which are clamped together in slots 31 of plastic strips 3 and 4. A carbon dioxide guide tube 7 is coiled inside the tube body, a top cover 5 and a bottom cover 6 are then used to enclose and form the completed carbon dioxide diffusing tube. The inside surfaces of the semi-shell bodies 1 and 2 have a plurality of protruding plates, each of which has an appropriate width and is projected inward. On the exterior surface of the diffusing tube body are the water inlet and outlet connections 16 and 26 with projected rings 12, 13 and 22, 23. The centers of the top cover 5 and bottom cover 6 have punched holes 51 and 61, from which a plastic ring 52 and a plastic gasket 62 are attached to respectively.

Next to the central punched holes 51 and 61 are openings 53 and 63, which are plugged up by pressure relief plugs 54 and 64 respectively.

The carbon dioxide diffusing tube has the following disadvantages:

(1) The tube is made up of two pieces of shell. Therefore, the sealing can never be tight enough to be leak proof.

(2) It is complex and inconvenient to assemble the tube together.

(3) The tube has a simple carbon dioxide guide tube which is coiled inside the diffusing tube body. It does not delay the release of carbon dioxide into water.

(4) The tube can only provide carbon dioxide which will be mixed in water. The tube can not generate oxygen to the aquarium tank. Therefore, its usage is limited.

SUMMARY OF THE INVENTION

The main object according to the present invention is to provide a filtering device for an aquarium tank in which the cup assembly is easy to assemble and it is flexible to be rotated for maximum filtering.

Another object according to the present invention is to provide a filtering device in which the cup assembly has a suction tube with an impeller. This increases carbon efficiency and prolongs its life inside the filtering device.

A further object according to the present invention is to provide a filtering material such as ion exchange resin or activated filter carbon granules, which are placed around the suction tube inside the cup bodies. The result is pure, crystal clear aquarium water.

Still another object according to the present invention is to provide a guide tube with a submerged motor for the filtering device. Carbon dioxide can be broken up quickly inside the guide tube and conditioned with the filtered water. This provides the needs for the fish and the plants inside the aquarium tank.

BRIEF DESCRIPTION OF THE DRAWINGS

The drawings disclose an illustrative embodiment of the present invention which serves to exemplify the various advantages and objects hereof, and are as follows:

FIG. 4a is a diagrammatic view showing the connection of the cup according to the present invention.

DETAILED DESCRIPTION OF THE PREFERRED EMBODIMENT

Figure 1:
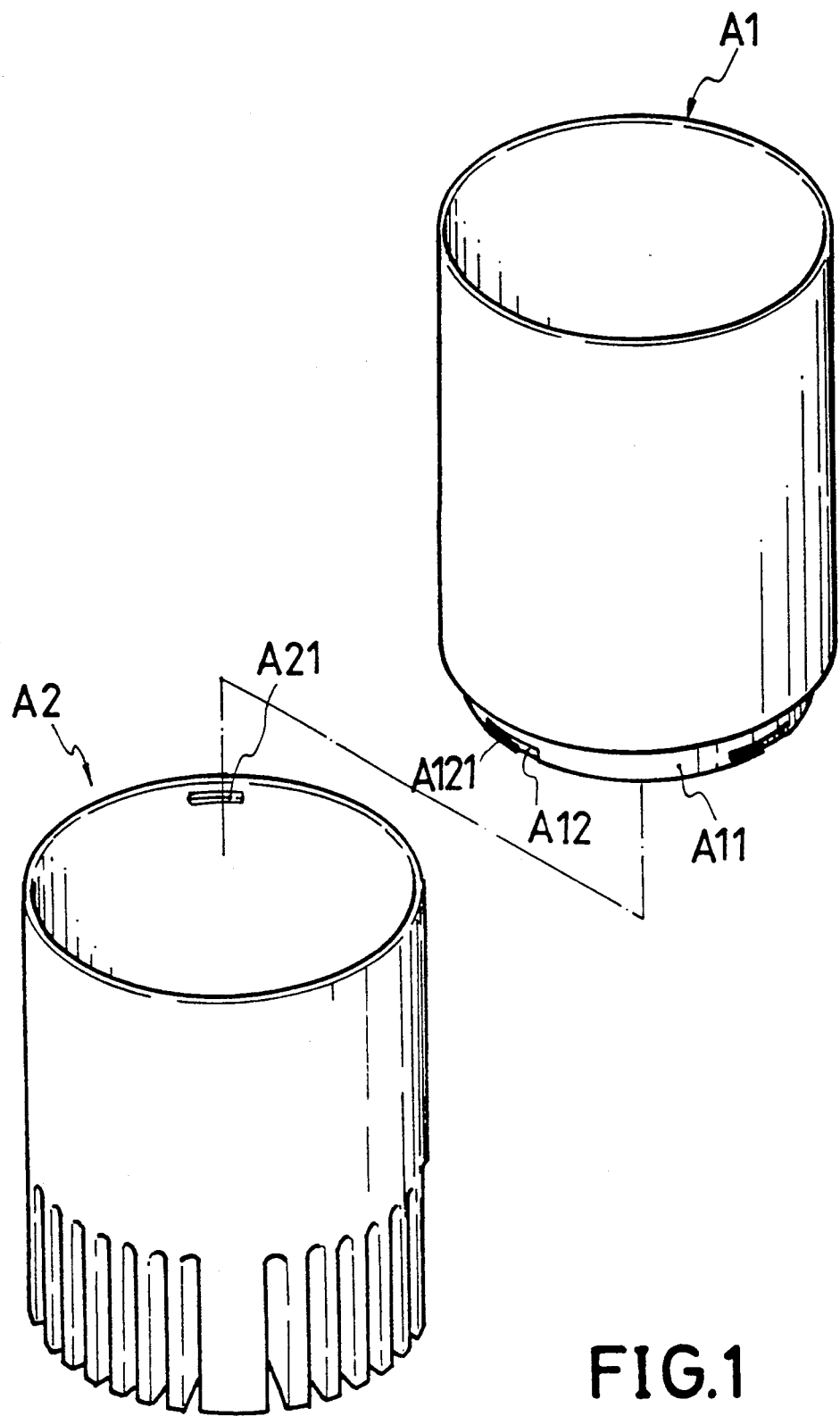
FIG. 1 shows a conventional cup assembly for the filtering device in which the upper cup can be placed on top of the lower cup and the two cups are connected together by twisting.
Figure 2:
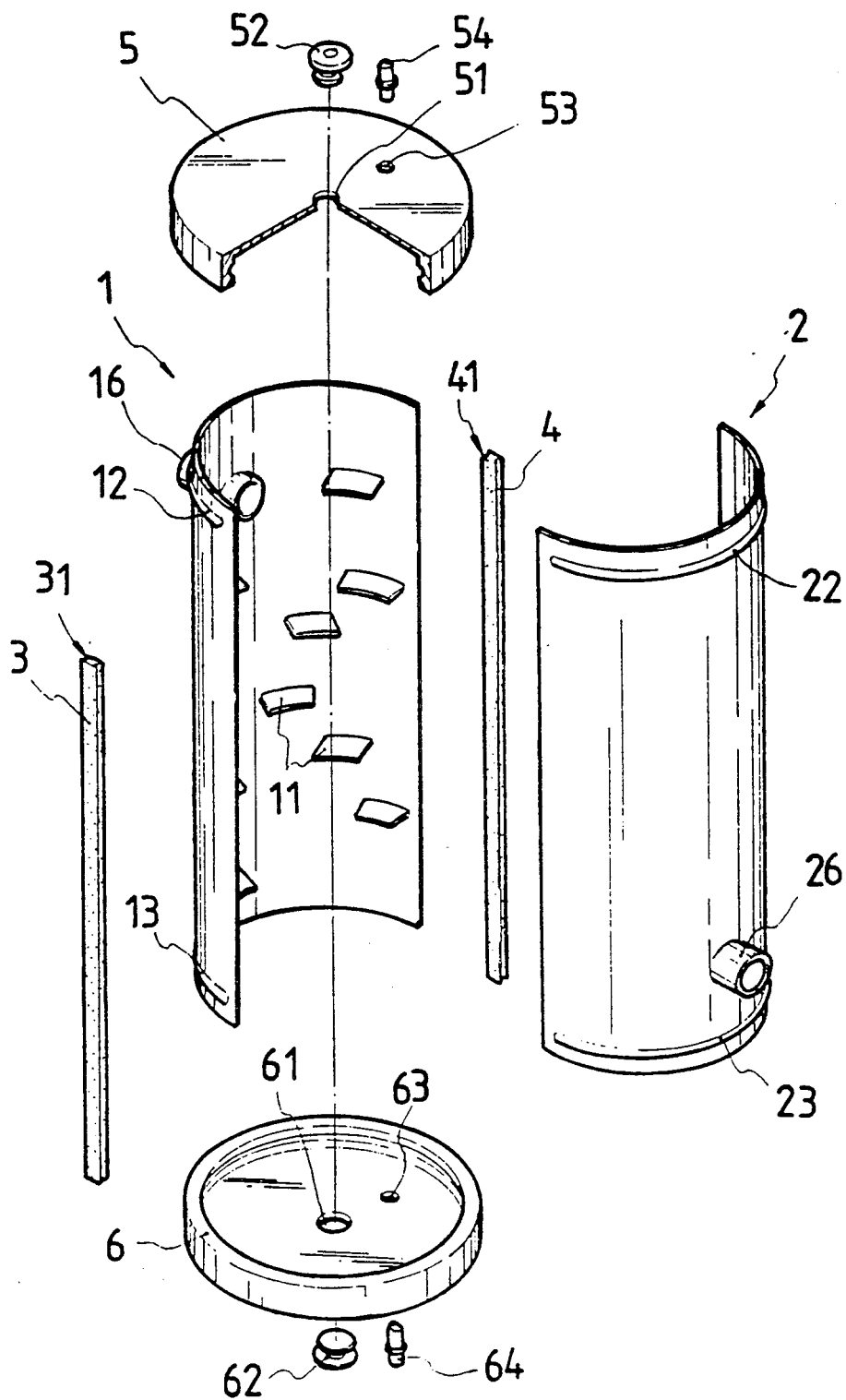
FIGS. 2a and 2b are respectively a fragmentary view and a front cross section of a conventional carbon dioxide diffusing tube.
Figure 2:
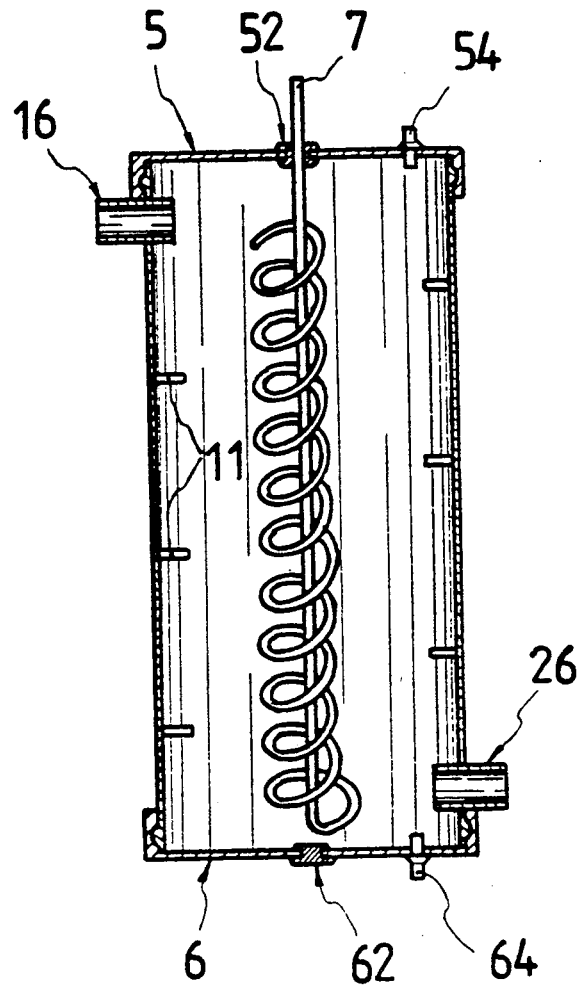
Figure 3:
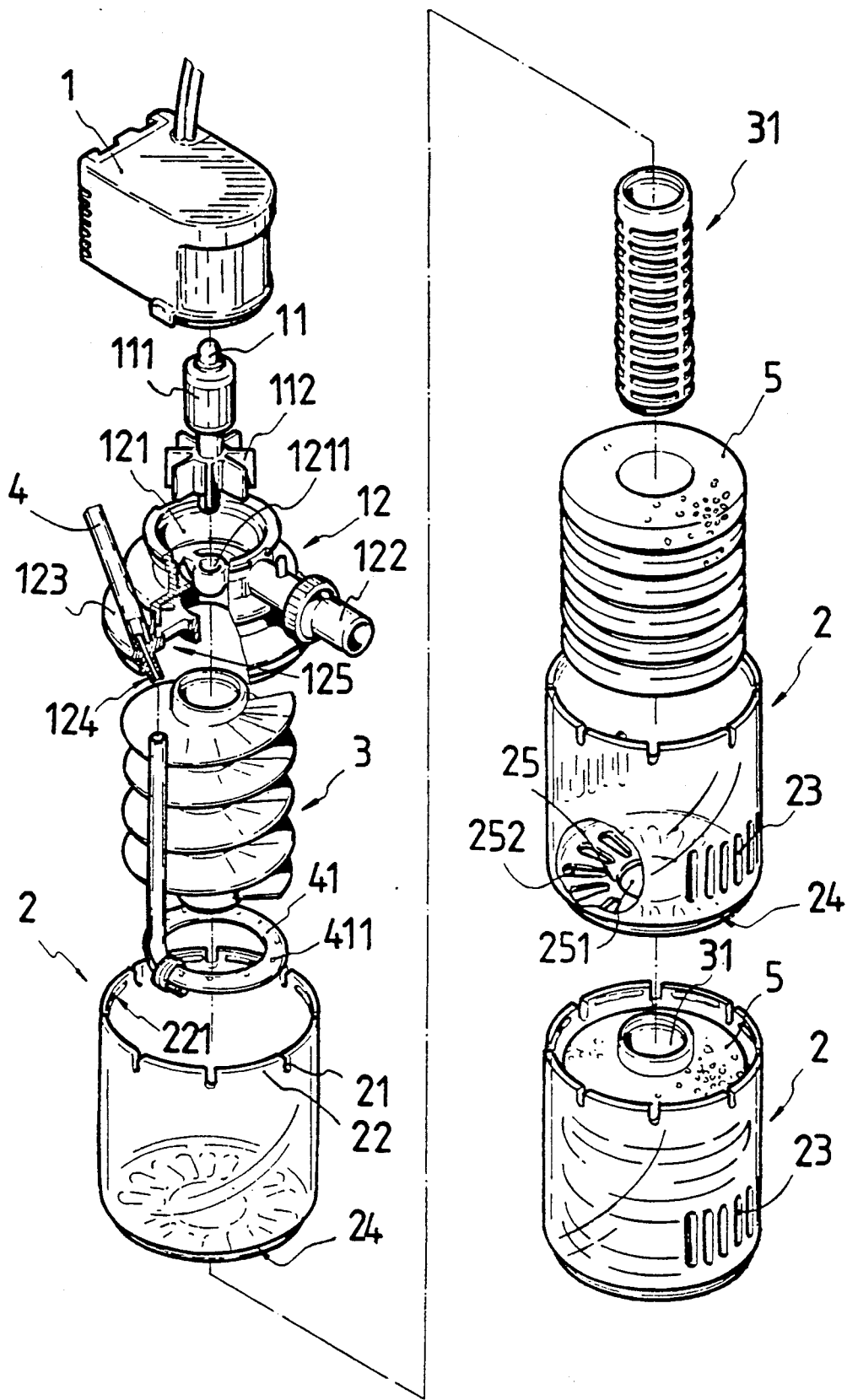
FIG. 3 is a perspective fragmented view of the aquarium tank filtering device according to the present invention.

Referring to FIG. 3, the improved filtering device for an aquarium tank according to the present invention mainly comprises a plurality of cups 2 which can be connected together, a submerged motor 1 which is placed on a rotating plate 12 at the very top of the cup 2, a sectional suction tube 3 with an impeller at the top section, a carbon dioxide guide tube 4 and filtering material 5.

A plurality of "U" notches 21 are formed at the rims of the cup 2. The distance between the "U" notches 21 are equal. An arc surface 22 is formed between every two "U" notches 21. The inner surface of the arc surface 22 has a lateral rib 221, which has an appropriate length. The number of the arc surface 22 is equal to the number of the lateral rib 221. The lower portion of each cup 2 has a plurality of straining slots 23, except the cup 2 at the very top section. The bottom edge of the cup 2 is tapered such that its diameter is smaller than the diameter of the cup itself. The tapered portion of the cup 2 has several circular connecting rings 24. On the center of the bottom surface 25 of the cup 2 is a hole 251 to which the suction tube 3 feeds through. A radial pattern of water inlet slots 252 circumscribe the hole 251. The water inlet slots 252 are used to direct the contaminated water in the aquarium tank 6 to the filtering device.

Figure 4:
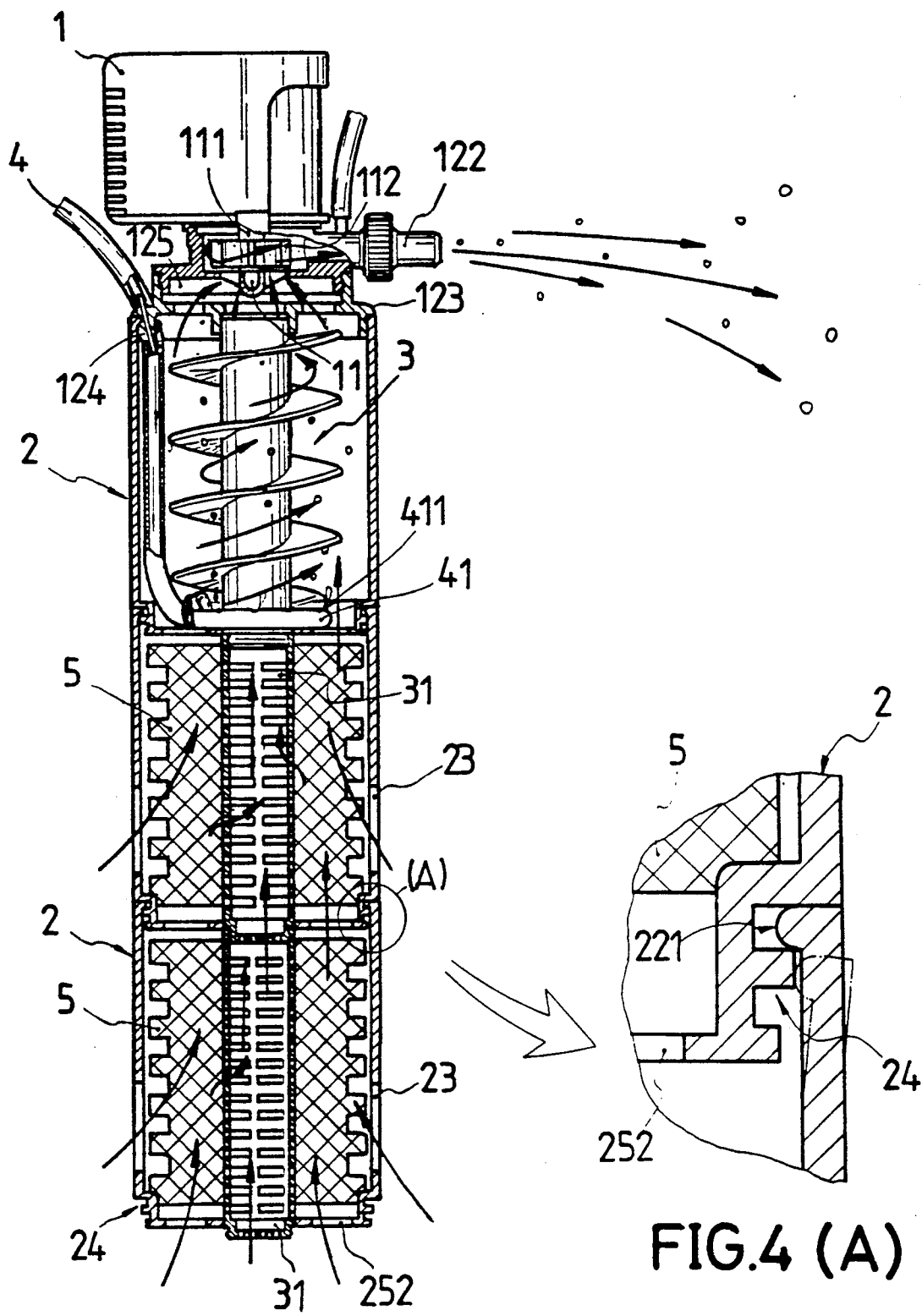
FIG. 4 is a cross-sectional view of an embodiment of the improved filtering device according to the present invention.

In use, several cups 2 are put together. The arc surface 22 at the top rim of a lower cup 2 and its associated lateral rib 221 are adapted to the connecting rings 24 of an upper cup 2. The lateral ribs 221 are pivotally placed on top of the connecting rings 24. The upper cup and the lower cup may be joined together either by direct fitting or twisting. The arc surface 22 at the top rim of the lower cup stretches out slowly and allows the two cups 2 to connect to each other, as shown in FIG. 4a. The cups that are connected together can further be rotated freely. This cup structure simplifies the assembly process and the rotation of the cups 2 also changes the direction of the straining slots 23 in the cups 2. Thus, the water flow can be changed without adjusting the overall filtering device in the aquarium tank. The quantity of the cups 2 can be added or eliminated as needed. In addition, the cups can be removed or replaced for cleaning purposes.

Referring to FIG. 3 in which different components are placed in different cups 2. The submerged motor 1 is located inside a motor chamber 121 of the rotating plate 12. The bottom surface of the motor chamber 121 is particularly made to fit the motor shaft 11. The bottom surface of the motor chamber 121 has a circular slot 1211 for the lower portion of the motor shaft 11 to fit in. In the upper portion of the motor shaft 11 is an impeller 112 which can be turned by the motor 1. The spinning of the impeller 112 draws the water upward to a water discharge tube 122. In the top section of the motor shaft is a magnet 111 which can be induced to rotate when electricity is applied to the motor. Please refer to FIG. 4 for a cross-sectional view of this embodiment.

The rotating plate 12 is a circular plate with layers. The lowest layer 123 has a tube hole for a carbon dioxide guide tube 4 to feed through. The bottom edge of the lowest layer 123 also extends into the upper part of the upper cup 2, and its inside surface has a matching wall tube 124 for the suction tube 3. This allows the suction tube 3 with the impeller in its upper part connected with the rotating plate 12. Therefore, the filtered water can be drawn through the suction tube 3 with a whirling and bubble effects. In addition, the suction tube 3 with the impeller at its upper part serves to delay the emission of the carbon dioxide from the guide tube 4 into the filtered water. The carbon dioxide guide tube 4 is inserted downward from the upper most cup 2 and the insertion stops within this cup 2. The end portion of the guide tube 4 is coiled around the inside wall of the upper cup 2 such that it is located below the suction tube 3 with the impeller. The coiled portion 41 of the guide tube 4 has a sufficient number of vented holes 411 arranged uniformly in the guide tube 4. This allows carbon dioxide to be released uniformly in the filtering device. The aforesaid submerged motor 1, the rotating plate 12, the water discharge tube 122, the carbon dioxide guide tube 4, the suction tube 3 are placed in the upper most cup 2 of the filtering device.

Figure 5:
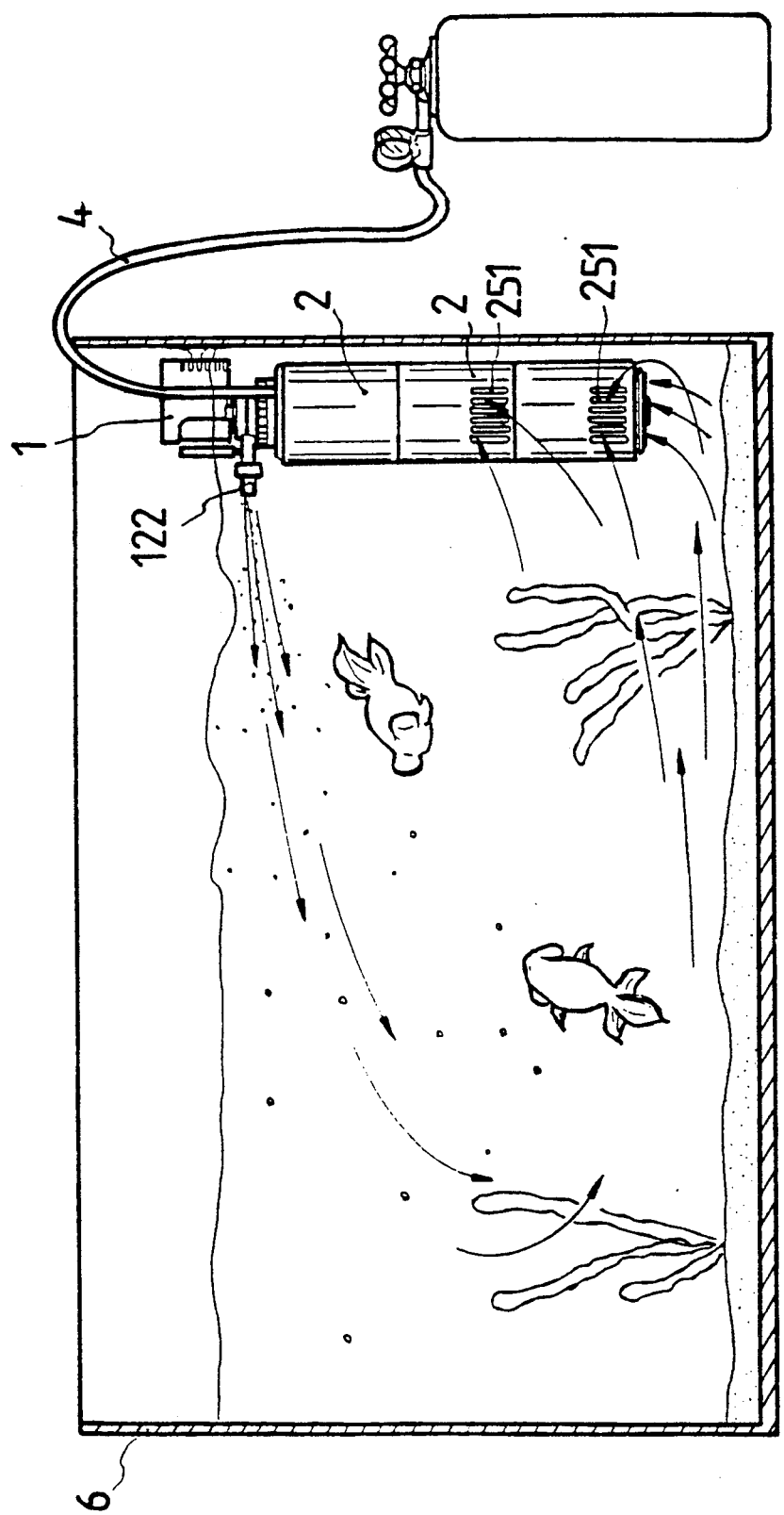
FIG. 5 shows an embodiment of the improved filtering device for an aquarium tank according to the present invention.

In addition, the central cup and the lower cup 2 assembly have circular layers of filtering cotton 5 and screen-shaped suction tube 31 inside the cup. This provides a double filtering effects. The filtering cotton 5 in the cup 2 may be replaced by ion exchange resin or activated carbon granules. The result of the filtering with the above material is pure and crystal clear water. An embodiment of the filtering device according to the present invention is shown in FIG. 5.

The improved filtering device can be used to remove contaminants and noxious odors in the aquarium tank 6. The filtered water is drawn upward by the motor 1 to the upper most cup 2. Carbon dioxide released from the guide tube 4 is then mixed with the crystal clear water in the upper most cup 2. The impeller 112 spins in the whirling chamber 125 to carbon dioxide with water. In the dissolving process, air bubbles are generated and blown out. Conditioned water from the discharging tube 122 are circulated with the water in the top layer of the tank so as to bring in more oxygen to the lower portion of the aquarium tank 6. The filtering device according to the present invention has a simple structure, easy to assemble and its internal parts are easy to clean.

What is claimed is:

1. An improved filtering device for an aquarium tank comprising a plurality of cups assembled together in a stack having a bottom and a top, a submerged motor having an output shaft which is placed on a rotating plate mounted on the top of the stack, a sectional suction tube with an impeller, a water discharge tube, a carbon dioxide guide tube and a filtering material; in which each cup in the stack having a rim with a plurality of "U" notches formed therein, the "U" notches being equidistantly spaced around each rim with an arc surface being formed between adjacent "U" notches, the inner surface of each arc having a lateral rib of a predetermined length; the side wall of each cup having a plurality of straining slots adjacent the cup bottom, the bottom of each cup having a tapered circumferential edge with a diameter smaller than the diameter of the cup itself, the tapered edge of each cup having a circular connecting rings; the bottom surface of the cup having an axial hole, said suction tube extending therethrough, a radial pattern of water inlet slots surrounding the hole, the water inlet slots being used to admit contaminated water to be filtered from the aquarium tank into said filtering device;

said motor, rotating plate, water discharge tube, carbon dioxide guide tube, suction tube with an impeller being mounted in the top cup of the stack, cups in the stack below the top cup having circular layers of filtering material therein and receiving said suction tube axially therethrough;

said rotating plate having a chamber receiving said motor therein, the bottom surface of the motor chamber receiving an edge of the motor shaft and an opposite end of the motor shaft coupled to said impeller whereby the motor drives the impeller to draw water upward through the suction tube to be expelled through said water discharge tube; a magnet means is mounted above said motor for inducing rotation when electricity is applied to said motor; said rotating plate having a tube hole for receiving said carbon dioxide tube the bottom of said plate having an axial hole communicating with said suction tube and the impeller so that filtered water can be drawn through the suction tube; said carbon dioxide guide tube being inserted downward into the top most cup the end portion of the guide tube being coiled around the inside wall of the top cup below the suction tube and the impeller; the coiled portion of the guide tube having a plurality of vented holes spaced uniformly around the guide tube to release carbon dioxide uniformly in said filtering device.

2. The improved filtering device of claim 1 wherein the arc surface at the top rim of the lower cups and its associated lateral rib receives the connecting ring of each upper cup so that stacked cups may be joined together and can be mutually rotated freely.

3. The improved filtering device of claim 1 wherein the submerged motor drives the impeller to draw the filtered water upward and to mix carbon dioxide released from the carbon dioxide guide tube therewith, the impeller producing a turbulent effect on the filtered water.

4. An improved filtering device as recited in claim 1 wherein the filtering material is at least one member selected from the group consisting of cotton, ion exchange resin and activated carbon granules.

* * * * *